(12) United States Patent
Lin et al.

(10) Patent No.: US 6,920,406 B1
(45) Date of Patent: Jul. 19, 2005

(54) METHOD OF MEASURING THE AZIMUTH AND RESETTING ZERO AZIMUTH AUTOMATICALLY

(75) Inventors: Ai-Ling Lin, Tichung Hsien (TW); Kuo-Hua Yang, Tichung Hsien (TW)

(73) Assignee: Asia Optical Co., Inc., T.E.P.E. (TW)

( * ) Notice: Subject to any disclaimer, the term of this patent is extended or adjusted under 35 U.S.C. 154(b) by 0 days.

(21) Appl. No.: 10/756,054

(22) Filed: Jan. 12, 2004

(51) Int. Cl.$^7$ .......................... G01C 17/38; G01P 21/00
(52) U.S. Cl. ...................................................... 702/95
(58) Field of Search .............................. 702/66, 71, 72, 702/87, 88, 94, 95, 124, 126, 189, 198, 199; 33/355 R, 356; 324/200, 244, 260

(56) References Cited

U.S. PATENT DOCUMENTS 6,606,799 B2 * 8/2003 Kato ............................ 33/356

* cited by examiner

Primary Examiner—Michael Nghiem
(74) Attorney, Agent, or Firm—Dellett & Walters

(57) ABSTRACT

A method of measuring the azimuth and resetting to zero azimuth automatically is disclosed. Multiple azimuths in longitudinal and latitudinal orientations are sampled by two orthogonal magnetic sensors installed in an azimuth meter, and then are output by corresponding first and second sine wave signals. These two sine wave signals are normalized by adjusting them to be of equal amplitude. The maximum and minimum values of the normalized sine wave signals are used to compute the average values of the respective normalized sine wave signals being of equal amplitude on the positive and negative sides. The resultant sine wave signals serve as the zero reference values for comparison with subsequently taken measuring signals to yield the actual azimuth. The numerical computation for the azimuth can be performed by a microprocessor with accuracy and high speed.

6 Claims, 4 Drawing Sheets

US 6,920,406 B1

METHOD OF MEASURING THE AZIMUTH AND RESETTING ZERO AZIMUTH AUTOMATICALLY

BACKGROUND OF THE INVENTION

1. Field of the Invention

The present invention relates to a method of measuring the azimuth and resetting to zero azimuth automatically, in particular to a method of precision tuning the longitudinal and latitudinal zero reference values in an azimuth meter in preparation for accurate measurement of the azimuth.

2. Description of Related Arts

Azimuth meters in general are either mechanical or electronic. Mechanical azimuth meters are low cost but their readability and accuracy are not very good. Electronic azimuth meters are favored by mountaineers and navigators as they possess high precision and good readability.

The electronic azimuth meter performs azimuth measuring with two orthogonal magnetic sensors. Intensity values of earth magnetism at the measuring site are collected by the magnetic sensors, and then output the corresponding sine wave signals. The electronic apparatus picks up the sine wave signals representing the earth magnetism at the site, processes the measured values through internal computation, and outputs the azimuth on the screen of the electronic apparatus. Since an electronic azimuth meter can rely on the internal electronic circuits to compute the azimuth, it does not need the realignment of the pointer scaling necessary for mechanical azimuth meters. However, it is necessary to set the conversion standard value, basing on which the sine wave signals output by the magnetic sensors can be processed to compute the azimuth, which means every electronic azimuth meter should have the capability of resetting to zero azimuth automatically in order to generate an accurate measurement of the azimuth.

The current practice of resetting to zero azimuth in an azimuth meter is by using two orthogonal oriented magnetic sensors to take sample measurements orthogonally. Since the two sine wave signals output by the two magnetic sensors are each out of phase by 90 degrees, the computation for the azimuth can be simplified by taking the two values having 90 degrees phase angle as the zero reference values. The output sine wave signals represent the magnitude of earth magnetism at the measuring site in the longitudinal and latitudinal orientations. If the measuring site is located in both high longitudinal and latitudinal coordinates, the amplitude of the sine wave signals will tend to increase in proportion to the angular coordinate, but if the measuring site is located in positions with large difference between the longitudinal and latitudinal coordinates, then the amplitude of the sine wave signals will vary greatly. Even with adjustment of zero azimuth at the first measuring site $(x_1, y_1)$ to generate adjusted zero reference values $(X_0, Y_0)$. If the measuring site is moved to a second location $(x_2, y_2)$, the computation of the azimuth still causes overflow errors. Therefore, the precision and applicability of conventional azimuth meters, as shown in FIG. 5, are considerably discounted.

SUMMARY OF THE INVENTION

The main object of the present invention is to provide a method of measuring azimuth with the capability to reset to zero azimuth automatically to assure accurate measurement of the azimuth even if the measuring site with large coordinate difference is moved after the zero azimuth adjustment.

To this end, the main instrumentality comprises the steps of taking a series of samples with two orthogonal magnetic sensors and outputting corresponding first and second sine wave signals, adjusting the amplitude of one of the two sine wave signals to cause the amplitude of both sine wave signals to be of equal amplitude, computing the average on the basis of the maximum and minimum values of the first and second sine wave signals from the two orthogonal-magnetic sensors, and taking the resultant average values of the respective sine wave signals as the zero reference values for use in subsequent measurement of the azimuth.

The above-mentioned steps of resetting to zero azimuths involve sampling the maximum and minimum values of the first and second sine wave signals from the two orthogonal magnetic sensors, and then these two sine wave signals are normalized by equalizing their amplitudes to avoid errors due to large coordinate differences. With automatic adjustment for zero azimuth, the measurement of the azimuth can be obtained at any place, with no limitation on movement and positions of the measuring site. Sample measurements are taken by the two orthogonal magnetic sensors, which then output the corresponding first and second sine wave signals in longitudinal and latitudinal directions. Again, through suitable amplitude adjustment, the two sine wave signals are matched against the corresponding zero reference values to come up with the azimuth at the site.

The features and structure of the present invention will be more clearly understood when taken in conjunction with the accompanying drawings.

DETAILED DESCRIPTION OF THE PREFERRED EMBODIMENT

The present invention provides a method of measuring the azimuth for resetting to zero azimuths automatically to be used on azimuth meters for rapid calculation of the azimuth. The azimuth meter, in accordance with the present invention, is operated by two orthogonal magnetic sensors, which take samples with different azimuths in longitudinal and latitudinal orientations, and output the sine wave signals corresponding to the magnitude of measured earth magnetism in the longitudinal and latitudinal directions for computation of the zero azimuth.

Figure 1:
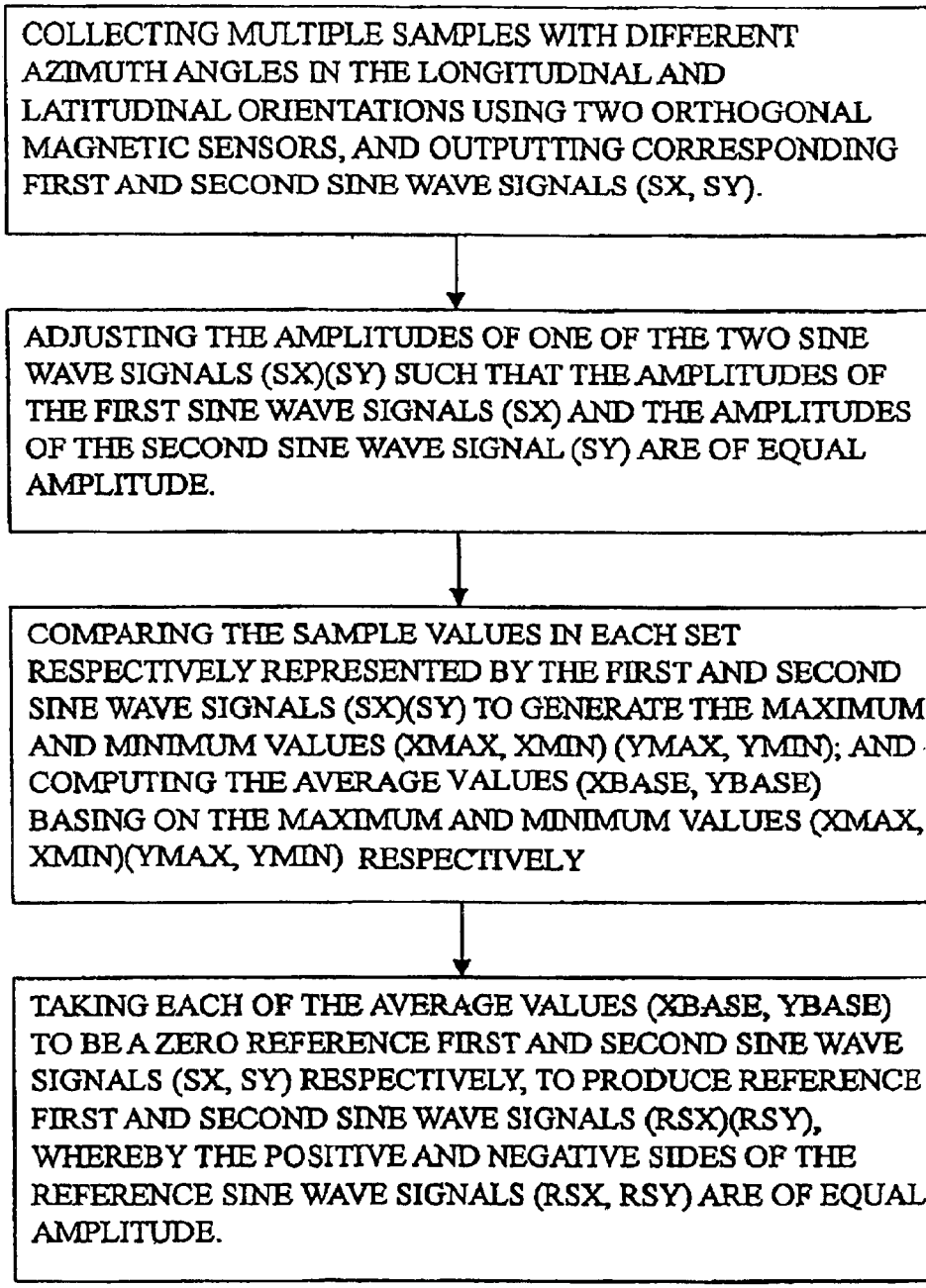
FIG. 1 is a procedural flow of resetting to zero azimuth in accordance with the present invention.
Figure 2:
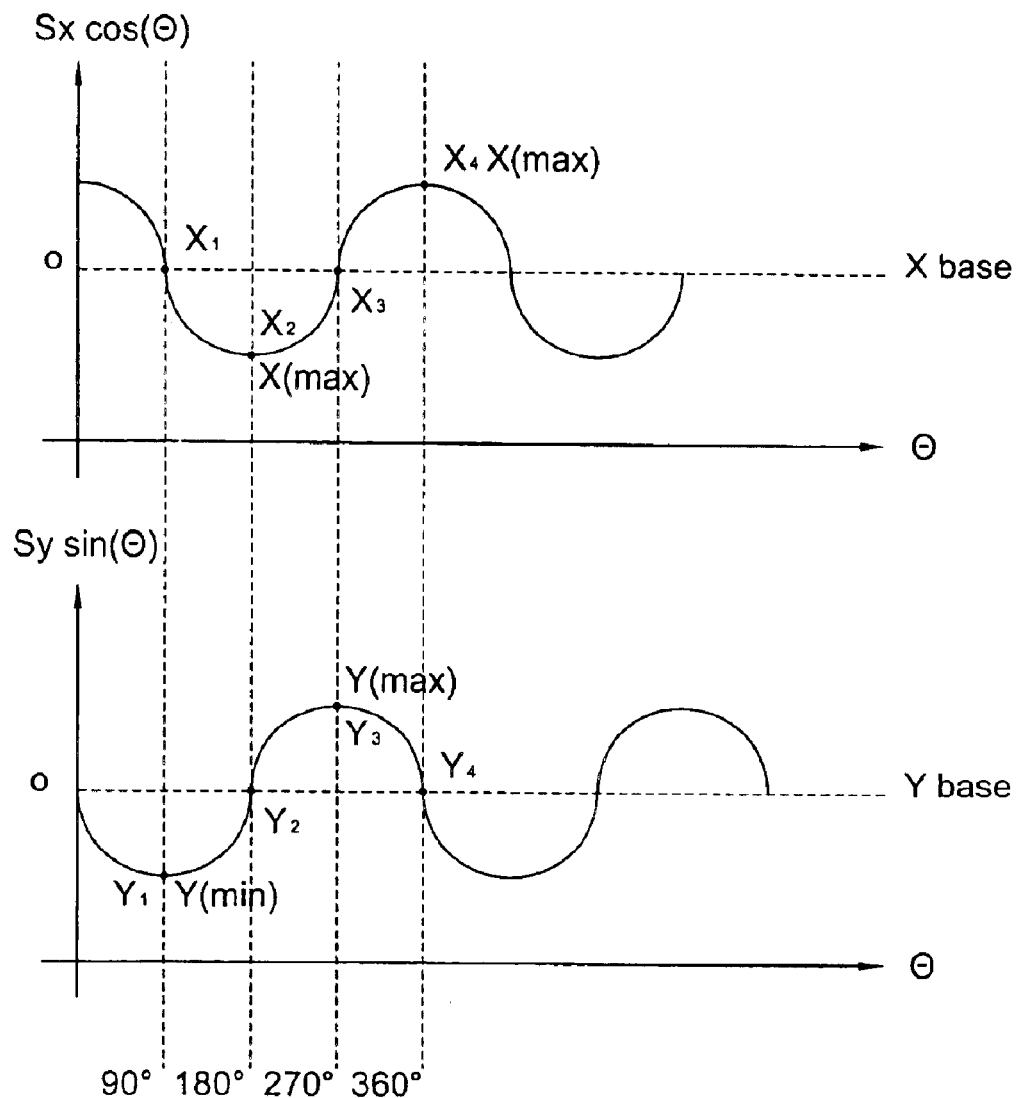
FIG. 2 is a waveform diagram of the first and second sine wave signals.

The resetting to zero azimuth, as shown in FIG. 1, is performed by means of two orthogonal magnetic sensors installed in an azimuth meter. Basically, the process of resetting to zero azimuth is to be accomplished in four stage processes, as shown in FIG. 1.

collecting multiple sets of samples from different azimuth angles, using the two orthogonal magnetic sensors, and outputting corresponding first and second sine wave signals (Sx) (Sy) in longitudinal and latitudinal orientations, whereby the first sine wave signal (Sx) and the second sine wave signal (Sy) are 90 degrees out of phase with each other;

adjusting the amplitude of one of the two sine wave signals (Sx/Sy) such that the amplitude of the first sine wave signal (Sx) and the amplitude of the second sine wave signal (Sy) are of equal amplitude, as shown in FIG. 2;

computing the average values (Xbase, Ybase) based on the maximum and minimum values of the first and second sine wave signals (Xmin, Ymin) (Xmax, Ymax) respectively; and taking each of the average values (Xbase, Ybase) to be the zero reference of the first and second sine wave signals (Sx, Sy) respectively, to produce reference first and second sine wave signals (RSx, RSy) whereby the positive and negative sides of the reference sine wave signals (RSx, RSy) are of equal amplitude.

Furthermore, likes the above mentioned first stage process, taking four samples in the first set (X1, X2, X3, X4) (Y1, Y2, Y3, Y4) by each magnetic sensor respectively; and compares the first set to find the maximum and minimum values (Xmax, Xmin) (Ymax, Ymin) among the sample values in each set to support the above mentioned third stage process to average the values.

In the above-mentioned second stage process, the way to adjust the amplitude of the first and second sine wave signals (Sx) (Sy) is by comparing the maximum value (X4) of the first sine wave signal (Sx) with the maximum value (Y1) of the second sine wave signal (Sy) to yield a differential ratio R1=X4/Y1 or R2=Y1/X4, and then either the second sine wave signal (Sy) is multiplied by the ratio R1 or the first sine wave signal (Sx) is multiplied by R2 to make the amplitudes of the first and second sine wave signals (Sx) (Sy) of equal amplitude.

Finally, the third-stage process is for computing the average values (Xbase, Ybase) basing on the maximum and minimum values (Xmax, Xmin) (Ymax, Ymin) among the sample values in each set.

The computation of average values (Xbase, Ybase) in the third stage can be expressed by two formulae:

$$X_{base} = \frac{X_{max} + X_{MIN}}{2} \quad Y_{base} = \frac{Y_{max} + Y_{MIN}}{2}.$$

Figure 3:
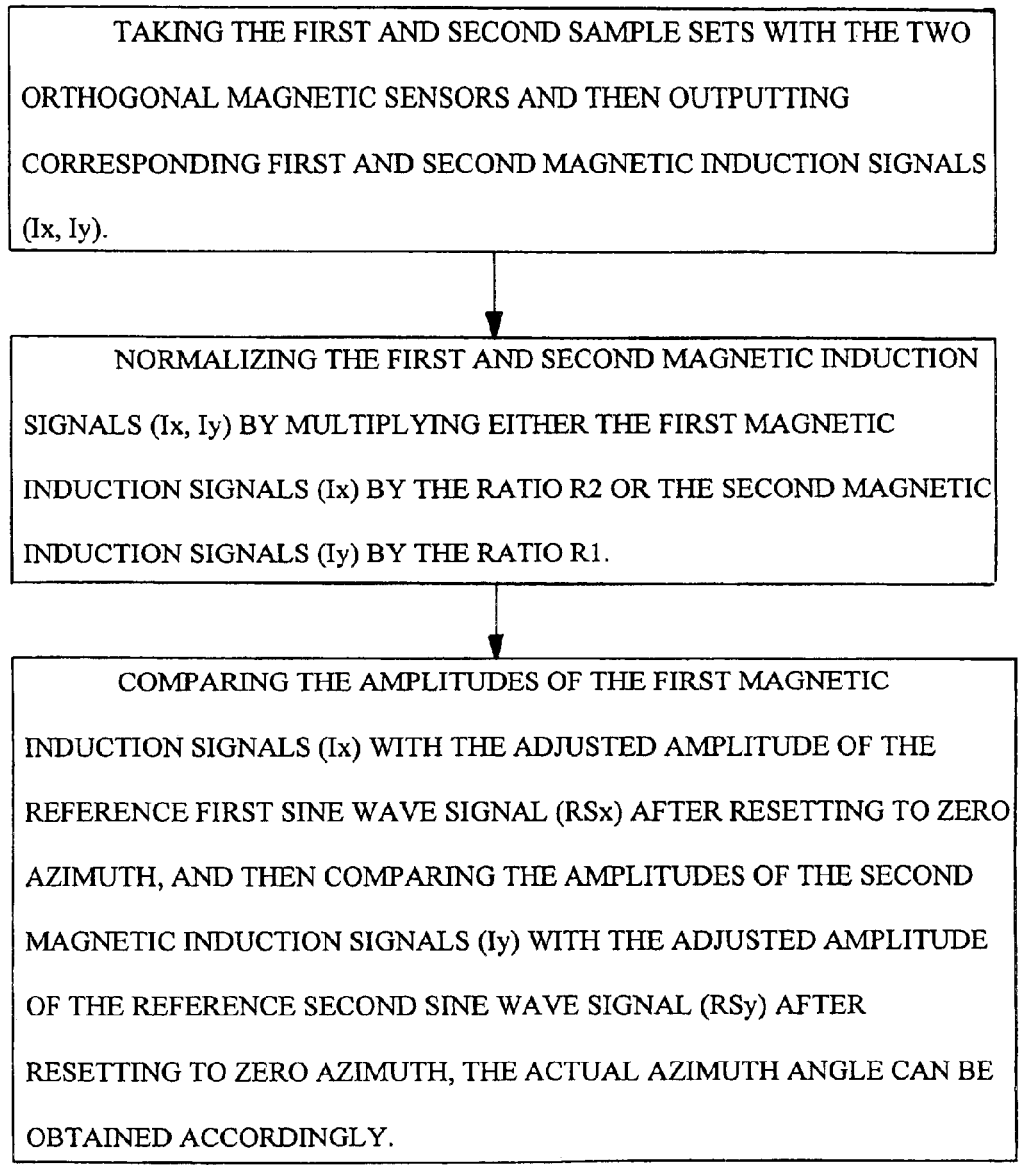
FIG. 3 is a procedural flow of the process of measuring the azimuth at a measuring site.

As shown in FIG. 3, the computation of average values to yield the azimuth comprises the steps of:

taking the first and second sample sets with the two orthogonal magnetic sensors and then outputting corresponding first and second magnetic induction signals (Ix, Iy);

normalizing the first and second magnetic induction signals (Ix, Iy) by multiplying either the first magnetic induction signals (Ix) by the ratio R2 or the second magnetic induction signals (Iy) by the ratio R1; and comparing the amplitudes of the first magnetic induction signals (Ix) with the adjusted amplitude of the reference first sine wave signal (RSx) after resetting to zero azimuth, and then comparing the amplitudes of the second magnetic induction signals (Iy) with the adjusted amplitude of the reference second sine wave signal (RSy) after resetting to zero azimuth, the actual azimuth angle can be obtained accordingly.

An actual example is to be explained below by applying the above-mentioned method of measuring the azimuth and resetting to zero azimuth automatically.

Figure 4:
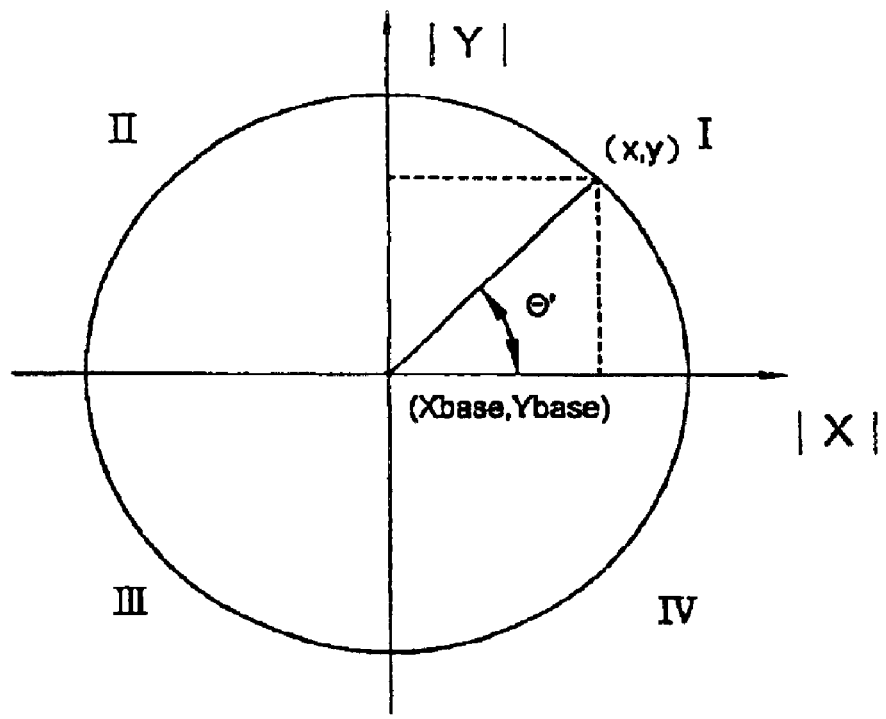
FIG. 4 is a representation of the azimuth taken by the present invention.
Figure 5:
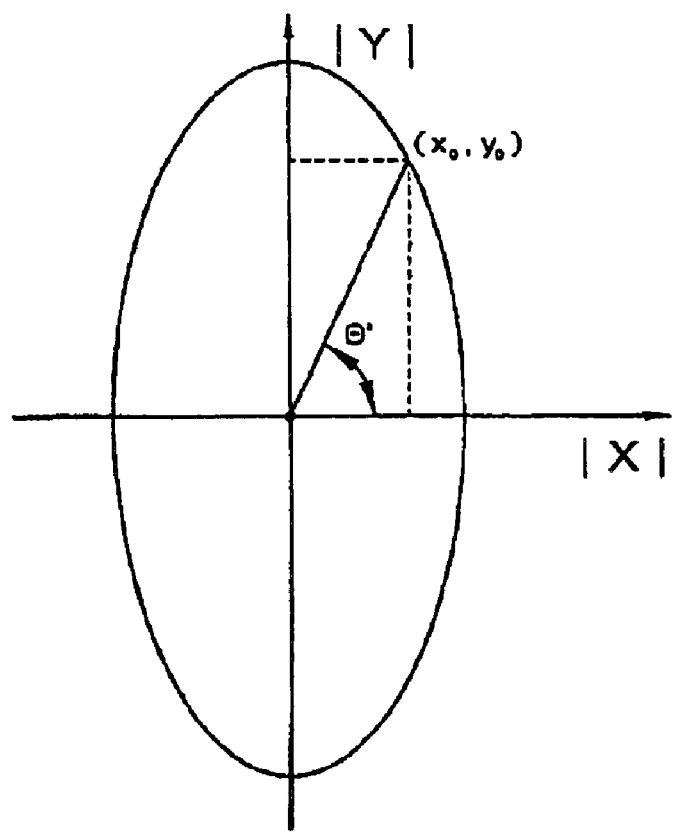
FIG. 5 is a representation of the azimuth taken by conventional azimuth meters.

Since the positive and negative sides of the first and second sine wave signals (RSx, RSy) having reset to zero azimuth are of equal amplitude, it is possible to represent the azimuth with a full circle, which is sub-divided into four different quadrants. The principles behind the method of measuring the azimuth and resetting to zero azimuth automatically are to be explained in conjunction with FIG. 4.

adjusting the amplitudes of the first and second magnetic induction signals (Ix, Iy) is to make the magnetic induction signals (Ix, Iy) fall into one of the quadrants in the full circle; subtracting the first and second magnetic induction signals (Ix, Iy) by the average values (Xbase, Ybase) is to determine in which quadrant the first and second magnetic induction signals (Ix, Iy) are located; if the difference values (Ix-Xbase, Iy-Ybase) are both positive, it can be determined that the two magnetic induction signals (Ix, Iy) are located in the first quadrant.

The next step is to compute the azimuth. Since the magnetic induction signals (Ix, Iy) are represented by the full circle, it is necessary to determine whether the amplitudes of the two magnetic induction signals (Ix, Iy) are equal; if yes, the azimuth should lie in the 45 degree quadrant; otherwise, the two magnetic induction signals (Ix, Iy) are plugged into a trigonometric function to find the value for computing the phase angle (θ).

According to the present invention, the sampling and normalization process for resetting to zero azimuth can be conducted using samples taken from different positions within the longitudinal and latitudinal coordinates, without affecting the accuracy of the azimuth. To facilitate the finding of the azimuth, the computation task can be largely managed by a microprocessor. To further enhance the practical value, an azimuth meter can be incorporated into a laser-operated distance measuring apparatus to render fully integrated functions.

The foregoing description of the preferred embodiments of the present invention is intended to be illustrative only and, under no circumstances, should the scope of the present invention be so restricted.

What is claimed is:

1. A method of resetting to zero azimuth automatically comprising the steps of:

collecting multiple samples with different azimuths in the longitudinal and latitudinal orientations using two orthogonal magnetic sensors, and outputting corresponding first and second sine wave signals;

adjusting the amplitudes of one of the first and second sine wave signals such that the amplitudes of the first sine wave signals and the amplitudes of the second sine wave signal are equal;

comparing the sample values in each set respectively represented by the first and second sine wave signals to generate the maximum and minimum values;

computing the average values based on the maximum and minimum values of the first and second sine wave signals, repectively, and taking each of the average values to be the zero reference value of the first and second sine wave signals, respectively, to produce refereence first and second sine wave signals, whereby the reference first and second sine wave signals have positive and negative sides of equal amplitude.

2. The method of resetting to zero azimuth as claimed in claim 1, wherein the first and second sine wave signals from the two magnetic sensors are 90 degrees out of phase with each other.

3. The method of resetting to zero azimuth as claimed in claim 1, wherein the method further comprises the steps of:

comparing the maximum value (Xmax) of the first sine wave signals and the maximum value (Ymax) of the second sine wave signals to yield a differential ratio R1=Xmax/Ymax; and multiplying the second sine wave signals by the differential ratio R1 such that the amplitudes of the first and second sine wave signals become equal.

4. A method of measuring the azimuth with an azimuth meter, wherein the azimuth meter has been reset to zero azimuth according to the method claimed in claim 3, comprising the steps of:

taking multiple samples respectively using two orthogonal magnetic sensors, and outputting corresponding first and second magnetic induction signals;

multiplying the second magnetic induction signals by a differential ratio R1, wherein, the differential ratio R1 is generated by the steps of:

collecting multiple samples with different azimuths in the longitudinal and latitudinal/orientations using two orthogonal magnetic sensors, and outputting first and second sine wave signals;

adjusting the amplitudes of one of the first and second sine wave signals such that the amplitudes of the first sine wave signals and the amplitudes of the second sine wave signal are equal;

comparing the sample values in each set respectively represented by the first and second sine wave signals to generate the maximum and minimum values;

computing the average values based on the maximum and minimum values of the first and second sine wave signals respectively, and taking each of the average values, to be the zero reference value of the first and second, sine wave signals, respectively, to produce reference, first and second sine wave signals; and comparing the maximum value (Xmax) of the first sine wave signals and the maximum value (Ymax) of the second sine wave signals to yield a differential ratio R1 Xmax/Ymax; and comparing amplitudes of the first magnetic induction signals with an adjusted a amplitude of the reference first sine wave signals, and comparing amplitudes of the second magnetic induction signals with an adjusted amplitude of the reference second sine wave signals, in order to generate the azimuth.

5. The method of resetting to zero azimuth as claimed in claim 1, wherein the method further comprises the steps of:

comparing the maximum value (Xmax) of the first sine wave signals and the maximum value (Ymax) of the second sine wave signal to yield a differential ratio R2=Ymax/Xmax; and multiplying the first sine wave signals by the differential ratio R2 such that the amplitudes of the first and second sine wave signals become equal.

6. A method of measuring the azimuth with an azimuth meter wherein,the azimuth, meter has been reset to zero azimuth according to the method claimed in claim 4, comprising the steps of:

taking multiple samples respectively using two orthogonal magnetic sensors; and outputting corresponding first and second magnetic induction signals (Ix, Xy);

multiplying the first magnetic induction signals (Ix) by a differential ratio R2, wherein the differential ratio R2 is generated by steps of:

collecting multiple samples with different azimuths in the longitudinal and latitudinal orientations using two orthogonal magnetic sensors, and outputting corresponding first and second sine wave signals;

adjusting the amplitudes of one of the first and second sine wave signals such that the amplitudes of the first sine wave signals and the amplitudes of the second sine wave signal are equal;

comparing the sample values in each set respectively represented by the first and second sine wave signals to generate the maximum and minimum values;

computing the average values based on the maximum and minimum values of the first and second sine wave signals, respectively, and taking each of the average values to be the zero reference value of the first and second signals to produce reference first and second sine wave signals; and comparing the maximum value (Xmax) of the first sine wave signals and the maximum value (Ymax) of the second sine wave signal to yield a differential ratio R2=Ymax/Xmax; and comparing the amplitudes of the first magnetic induction signals with the adjusted amplitude of the reference first sine wave signals, and comparing the amplitudes of the second magnetic induction signals with the adjusted amplitude of the reference second sine wave signals, in order to generate the azimuth.

* * * * *